United States Patent [19]
Satzinger et al.

[11] 3,882,164
[45] May 6, 1975

[54] DEXTROROTATORY 3r-N-MONOMETHYL-AMINO-4c-PHENYL-4t-ETHOXYCARBONICYCLOHEXENE-1 AND PROCESS FOR THE PRODUCTION THEREOF

[75] Inventors: Gerhard Satzinger; Wolfgang Herrmann, both of Denzlingen; Manfred Herrmann, Gundelfingen, all of Germany

[73] Assignee: Warner-Lambert Company, Morris Plains, N.J.

[22] Filed: July 5, 1973

[21] Appl. No.: 376,845

Related U.S. Application Data
[63] Continuation-in-part of Ser. No. 266,036, June 26, 1972, abandoned.

[52] U.S. Cl. .............................................. 260/471 A
[51] Int. Cl. .............................................. C07c 101/14
[58] Field of Search .............................. 260/471 A

[56] References Cited
UNITED STATES PATENTS
3,679,732   7/1972   Novack .......................... 260/471 A

*Primary Examiner*—Lorraine A. Weinberger
*Assistant Examiner*—L. A. Thaxton
*Attorney, Agent, or Firm*—Albert H. Graddis; Frank S. Chow; George M. Yahwak

[57] ABSTRACT

The present invention relates to (+)-3r-N-monomethylamino-4c-phenyl-4t-ethoxycarbonylcyclohexane-1 ((+)-I),

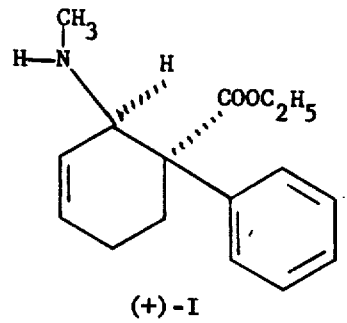

(+)-I salts thereof, and methods for the production of said compounds. The compounds of the invention exhibit analgesic activity in mammals and are useful for the reduction or alleviation of pain.

6 Claims, No Drawings ing invention (+)-3r-N-monomethylamino-4c-phenyl-4t-ethoxycarbonylcyclohexene-1 is the dextrorotatory isomer of the potent analgesic, (±)-3r-N-monomethylamino-4c-phenyl-4t-ethoxycarbonylcyclohexene-1 described in U.S. Pat. No. 3,792,080.

DEXTROROTATORY 3R-N-MONOMETHYL-AMINO-4C-PHENYL-4T-ETHOXYCARBONICYCLOHEXENE-1 AND PROCESS FOR THE PRODUCTION THEREOF

This application is a continuation-in-part of our co-pending application, U.S. Ser. No. 266,036 filed June 26, 1972, now abandoned.

BRIEF DESCRIPTION OF THE INVENTION

The present invention relates to (+)-3r-N-monomethylamino-4c-phenyl-4t-ethoxycarbonylcyclohexene-1, the hydrochloride, the D-(−)-O,O-dibenzoyltartrate, the L-(+)-O,O-dibenzoyltartrate and other medicinally acceptable acid addition salts thereof. The present invention also relates to two methods for the production of the afore-named optically active base of (+)-3r-N-monomethylamino-4c-phenyl-4t-ethoxycarbonylcyclohexene-1 and salts thereof. The first method involves the resolution of (±)-3r-N-monomethylamino-4c-phenyl-4t-ethoxycarbonylcyclohexene-1 into its optical antipodes. The alternative method consists of the brominative-hydrolytic demethylation of (+)-3r-N-dimethylamino-4c-phenyl-4t-ethoxycarbonylcyclohexene-1 to (+)-3r-N-monomethylamino-4c-phenyl-4t-ethoxycarbonylcyclohexene-1.

The compounds of this invention, (+)-3r-N-monomethylamino-4c-phenyl-4t-ethoxycarbonylcyclohexene-1 and salts thereof, show analgesic activity in mammals and are more potent and have a higher therapeutic ratio than the corresponding racemic compound, (±)-3r-N-monomethylamino-4c-phenyl-4t-ethoxycarbonylcyclohexene-1.

DETAILED DESCRIPTION OF THE INVENTION

The present invention relates to (+)-3r-N-monomethylamino-4c-phenyl-4t-ethoxycarbonylcyclohexene-1, the hydrochloride, the D-(−)-O,O-dibenzoyltartrate, the L-(+)-O,O-dibenzoyltartrate and other medicinally acceptable acid addition salts thereof. This invention also relates to methods for the production of (+)-3r-N-monomethylamino-4c-phenyl-4t-ethoxycarbonylcyclohexene-1 and the afore-named salts.

The parent compound of this invention, (+)-3r-N-monomethylamino-4c-phenyl-4t-ethoxycarbonylcyclohexene-1, is the dextrorotatory isomer of the potent analgesic, (±)-3r-N-monomethylamino-4c-phenyl-4t-ethoxycarbonylcyclohexene-1 described in U.S. Pat. No. 3,792,080. The dextrorotatory base is structurally related to the effective, relatively non-toxic analgesic, (±)-3r-N-dimethylamino-4c-phenyl-4t-ethoxycarbonylcyclohexene-1, disclosed in U.S. Pat. No. 3,557,127, issued Jan. 19, 1971; the former being the nitrogen demethyl derivative of the latter.

The parent compound of this invention (+)-3r-N-monomethylamino-4c-phenyl-4t-ethoxycarbonylcyclohexene-1, is prepared by two fundamentally different processes. In the first, racemic -, i.e., (±)-3r-N-monomethylamino-4c-phenyl-4t-ethoxycarbonylcyclohexene-1 is dissolved in a suitable solvent, such as, methanol, ethanol, 2-propanol, water or acetone, preferably acetone, and the resulting solution is treated with a solution of one molar-equivalent of D-(−)-O,O-dibenzoyltartaric acid hydrate and a suitable solvent, such as methanol, ethanol, 2-propanol, water or acetone, preferably acetone, at room temperature. The solution is allowed to stand at room temperature for approximately 18 hours and the precipitate, which consists predominantly of (−)-3r-N-monomethylamino-4c-phenyl-4t-ethoxycarbonylcyclohexene-1 D-(−)-O,O-dibenzoyltartrate, is removed by filtration.

The filtrate is evaporated, the residue is dissolved in an aqueous system and the base is liberated by the addition of an aqueous solution of an alkaline metal hydroxide, for example, sodium hydroxide, potassium hydroxide, or ammonium hydroxide. By this process, (+)-3r-N-monomethylamino-4c-phenyl-4t-ethoxycarbonylcyclohexene-1 is obtained as a colorless oil.

Hydrohalides of the dextrorotatory base are prepared by treatment of a solution of (+)-3r-N-monomethylamino-4c-phenyl-4t-ethoxycarbonylcyclohexene-1 and an appropriate solvent, such as ethyl acetate, with a solution of the hydrogen halide and the same solvent. For example, the hydrochloride of is obtained when an ethyl acetate solution of (+)-3r-N-monomethylamino-4c-phenyl-4t-ethoxycarbonylcyclohexene-1 hydrogen chloride is added to an ethyl acetate solution of (+)-3r-N-monomethylamino-4c-phenyl-4t-ethoxycarbonylcyclohexene-1.

The D-(−)-O,O-dibenzoyltartrate of (+)-3r-N-monomethylamino-4c-phenyl-4t-ethoxycarbonylcyclohexene-1 is obtained by treatment of a solution of (+)-3r-N-monomethylamino-4c-phenyl-4t-ethoxycarbonylcyclohexene-1 and a suitable inert solvent, for example acetone, with a solution of D-(−)-O,O-dibenzoyltartaric acid hydrate and an appropriate solvent, such as acetone. The diastereoisomeric salt, (+)-3r-N-monomethylamino-4c-phenyl-4t-ethoxycarbonylcyclohexene-1 L (+)-O,O-dibenzoyltartrate, of (+)-I D-(−)-O,O-dibenzoyltartrate is obtained directly from (±)-3r-N-monomethylamino-4c-phenyl-4t-ethoxycarbonylcyclohexene-1 by the addition of a solution of L (+)-O,O-dibenzoyltartaric acid hydrate and a suitable solvent such as acetone to a solution of (±)-3r-N-monomethylamino-4c-phenyl-4t-ethoxycarbonylcyclohexene-1 and an appropriate solvent such as acetone.

The resolution of a racemic mixture of basic compounds into the corresponding optical isomers usually involves the treatment of the racemic mixture with an optically active acid followed by fractionation of the resultant mixture into its optically pure components and subsequent liberation of each optically pure base from the corresponding diastereoisomer. The fractionation step, usually repeated recrystallizations, of the common resolution process is time-consuming, expensive and wasteful in that very low yields of optically pure compounds are normally obtained.

Unlike the traditional resolution processes, the present process utilizes both the dextro- and levorotatory isomers of the optically active acid. In the instant case, D-(−)-O,O-dibenzoyltartaric acid hydrate and L-(+)-O,O-dibenzoyltartaric acid hydrate were employed and the discovery was made that the former forms a difficultly soluble salt in essentially quantitative yield with the levo rotatory base so that the desired dextrorotatory base can be recovered from the mother liquor. The discovery was also made that the latter forms a sparingly soluble salt with dextrorotatory base so that it may be separated directly from the racemic mixture in high yield. The present process represents an unexpected and beneficial improvement over traditional resolution processes.

The instant resolution process is delineated below in schematic form:

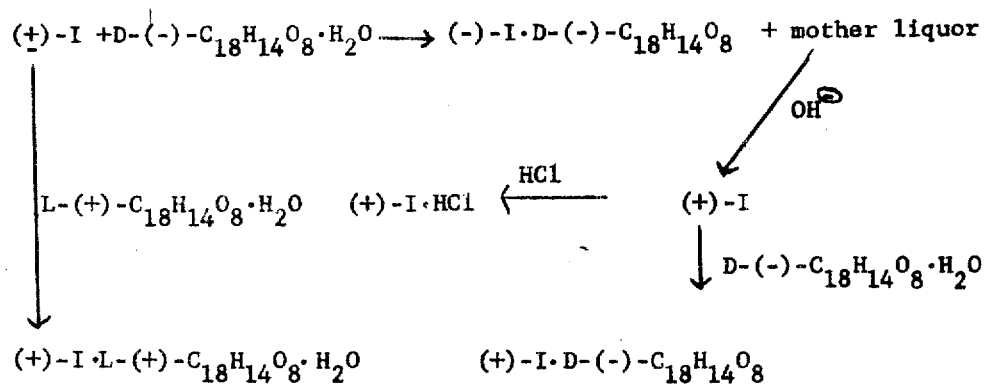

In the second process, (+)-3r-dimethylamino-4c-phenyl-4t-ethoxycarbonylcyclohexene-1, described in West German Pat. No. 1,923,247, issued July 8, 1971, is converted to (+)-3r-monomethylamino-4c-phenyl-4t-ethoxycarbonylcyclohexene-1 by the procedure reported in U.S. Pat. Application, Ser. No. 117,142, for the demethylation of (±)-3r-dimethylamino-4c-phenyl-4t-ethoxycarbonylcyclohexene-1 to (±)-3r-monomethylamino-4c-phenyl-4t-ethoxycarbonylcyclohexene-1. In the instant process, (+)-3r-dimethylamino-4c-phenyl-4t-ethoxycarbonylcyclohexene-1 is dissolved in a suitable solvent, such as chloroform, and is brominated by the dropwise addition of bromine dissolved in the same solvent at $-15°C$ to $20°C$, preferably at $-10°C$, to said solution. The reaction mixture is then hydrolyzed at room temperature and the desired dextrorotatory isomer of (+)-3r-N-monomethylamino-4c-phenyl-4t-ethoxycarbonylcyclohexene-1 is isolated as the hydrochloride by basification with an alkaline metal hydroxide, for example, sodium hydroxide, potassium hydroxide, or ammonium hydroxide, separation of the organic phase, evaporation of the organic phase, dissolution of the residue in an appropriate solvent such as ethyl acetate and addition of hydrogen chloride in the same solvent. The present demethylation process is depicted below in schematic form:

ent of (+)-II is unexpected to one skilled in the art. Moreover, the demethylation of (+)-II to (+)-I without racemization of the susceptible optical centers is unpredictable to one so skilled.

The lower-case letters r, c and t preceding the name of a functional group in the nomenclature of the instant cyclohexenes means reference, cis and trans, respectively, and defines the stereochemical arrangement of the groups attached to the cyclohexene ring system. As shown in the spatial structural formula for (+)-3r-N-monomethylamino-4c-phenyl-4t-ethoxycarbonylcyclohexene shown below, when the monomethylamino group is arbitrarily chosen as the reference group and located above the average plane of the cyclohexene ring, the phenyl group is situated on the same side of the average plane of the cyclohexene ring system as the monomethylamino group, i.e., is cis (c) to the reference (r) group, and the ethoxycarbonyl group is situated on the opposite side of the average plane of the cyclohexene ring as the reference group, i.e., is trans (t) to the reference group.

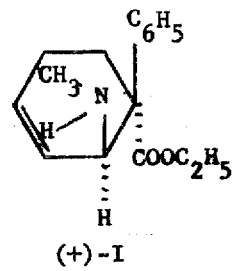

(+)-I

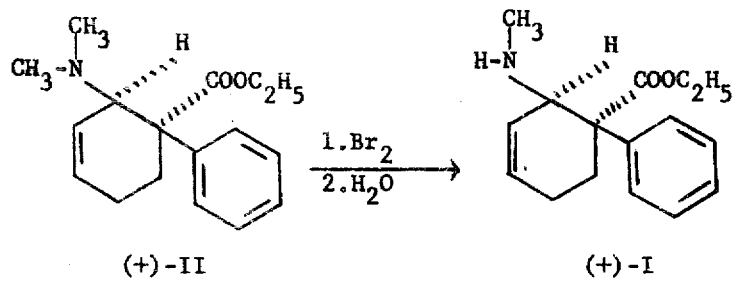

The above described demethylation process presents several unexpected and unpredictable features. Prior to the disclosure U.S. Pat. No. 3,792,080, the fundamental transformation, the brominative-hydrolytic cleavage of one of the two methyl groups bound to the nitrogen atom of (+)-II, of the above process was without precedent in organic chemistry. The high yield conversion of (+)-II to (+)-I without concomitant bromination of the olefinic linkage, allylic positions or the phenyl substitu- The compounds of the present invention exhibit analgesic activity and are useful for the reduction of and alleviation of pain. Like (±)-3r-N-monomethylamino-4c-phenyl-4t-ethoxycarbonylcyclohexene-1 ( (±)-I ) described in U.S. Pat. No. 3,792,080, (+)-3r-N-monomethylamino-4c-phenyl-4t-ethoxycarbonylcyclohexene, the dextrorotatory optical isomer of (±)-3r-N-monomethylamino-4c-phenyl-4t-ethoxycarboylcyclohexene-1 shows analgesic activity in the phenyl-p- quinone writhing test. The instant compound (+)-3r-N-monomethylamino-4c-phenyl-4t-ethoxycarbonylcyclohexene-1 hydrochloride is 3.3, 2.4 and 2.5 times more potent than (±)-3r-N-monomethylamino-4c-phenyl-4t-ethoxycarbonylcyclohexene-1 hydrochloride when administered intragastrically (ig), subcutaneously (sc) or intravenously (iv), respectively, to the mouse in this test. In addition, the dextrorotatory isomer (+)-3r-N-monomethylamino-4c-phenyl-4t-ethoxycarbonylcyclohexene-1 hydrochloride is therapeutically more effective by a factor of 2.6 to 3.1 (depending upon the mode of administration) than its racemic counterpart. (±)-3r-N-monomethylamino-4c-phenyl-4t-ethoxycarbonylcyclohexene-1 hydrochloride, as defined by the therapeutic ratio (Q). The D-(-)-O,O-dibenzoyl- and L-(+)-O,O-dibenzoyltartrates of (+)-3r-N-monomethylamino-4c-phenyl-4t-ethoxycarbonylcyclohexene-1 are more potent and more effective analgesics than (±)-3r-N-monomethylamino-4c-pheny-4t-ethoxycarbonylcyclohexene-1 hydrochloride in the aforementioned tests and the optically active base (+)-3r-N-monomethylamino-4c-phenyl-4t-ethoxycarbonylcyclohexene-1 is about as potent and effective as the racemic hydrochloride (±)-HCl. Moreover, the dextrorotatory base (+)-3r-N-monomethylamino-4c-phenyl-4t-ethoxycarbonylcyclohexene-1 as well as the salts thereof exemplified in this specification are more potent and therapeutically effective than Merperidine, the present leader in the analgesic market. The optically active compounds of this invention show unexpected and beneficial biological properties over the prior art racemic compound (±)-3r-N-monomethylamino-4c-phenyl-4t-ethoxycarbonylcyclohexene-1 and the clinically useful analgesic, Merperidine.

Therapeutic ratio (Q) is defined as the ratio of lethal dose-50 ($LD_{50}$) divided by the effective dose-50 ($ED_{50}$), that is, $$Q = LD_{50}/ED_{50}$$

The biological data is displayed in tabular form in the chart shown below:

The compounds of this invention can be formulated with various pharmaceutical carriers to form dosage units for administration to mammalian hosts. These dosage forms, which are well known to those skilled in the art, include tablets, capsules, solutions, suspensions, emulsions, syrups, etc. for oral administration, suppositories for rectal administration and solutions and other liquid compositions for parenteral administration. Pharmaceutical carriers, also apparent to persons skilled in the art, include inert substances such as water, saline, gelatin, lactose, starch or other compatible materials commonly used for the formulation of medicaments. The dosage forms can be sterilized, buffered, preserved, etc. Wetting agents, osmotic pressure modifiers, such as salts, emulsion stabilizers, etc., can be included in the formulation. The compositions can be formulated by conventional methods and techniques known to those skilled in the art.

Formulations containing approximately 5 to 30 mg of the analgesic compounds of this invention can be administered three times a day to human subjects.

The following examples serve to illustrate the embodiments of the invention and are not to be interpreted as limiting the scope of the invention:

EXAMPLE 1

(+)-3r-N-MONOMETHYLAMINO-4c-PHENYL-4t-ETHOXYCARBONYLCYCLOHEXENE-1. RESOLUTION METHOD.

In this example, a solution of 259.4 g (1 mole) of (±)-3r-N-monomethylamino-4c-phenyl-4t-ethoxycarbonylcyclohexene-1 and acetone (0.5 l.) is added at room temperature to a solution of 376.3 g (1 mole) of D-(−)-O,O-dibenzoyltartaric acid-monohydrate in 1.5 l. of acetone. After standing overnight, the precipitate is collected. It consists mainly of (−)-3r-N-monomethylamino-4c-phenyl-4t-ethoxycarbonylcyclohexene-(1)D-(−)-O,O-dibenzoyltartrate. The filtrate is evaporated to dryness. The crystalline residue is dissolved in water, the base is liberated by ammonium hydroxide and extracted with benzene. After drying the organic phase over anhydrous sodium sulfate, the solvent is evaporated. A resi-

CHART

| Substance | Type of Administration | $LD_{50}$ mg/kg | Acute Toxicity Mouse Confidence Limits p=0.05 | | $ED_{50}$ mg/kg | Phenyl-p-quinone Mouse Confidence Limits p=0.05 | | Therapeutic Ratio Q |
|---|---|---|---|---|---|---|---|---|
| | | | Lower | Upper | | Lower | Upper | |
| DL.HCl | ig. | 206.8 | 172.3 | 248.2 | 20.0 | 17.0 | 23.6 | 10.3 |
| | sc. | 184.9 | 146.7 | 233.0 | 4.2 | 3.3 | 5.2 | 44.0 |
| | iv. | 40.5 | 33.7 | 48.5 | 3.6 | 3.0 | 4.3 | 11.2 |
| D.HCl | ig. | 191.9 | 136.1 | 270.6 | 6.0 | 4.7 | 7.7 | 32.0 |
| | sc. | 204.2 | 185.6 | 224.6 | 1.77 | 1.14 | 2.73 | 115.3 |
| | iv. | 50.0 | 48.8 | 56.9 | 1.45 | 1.04 | 2.87 | 34.4 |
| D.Dibenzoyl-D-tartrate | ig. | 684.9 | 511.1 | 917.7 | 17.8 | 13.1 | 24.2 | 38.4 |
| D.Dibenzoyl-L-tartrate | ig. | 1616.7 | 1325.2 | 1972.4 | 26.6 | 22.1 | 31.9 | 60.7 |
| D (base) | ig. | 241.0 | 181.2 | 320.5 | 22.5 | 17.3 | 29.2 | 10.7 |
| Meperidine[+] | ig. | 252.0 | 205.7 | 308.7 | 62.2 | 48.9 | 78.9 | 4.05 |
| | sc. | 154.0 | 122.0 | 194.3 | 16.6 | 13.1 | 20.9 | 9.3 |
| | iv. | 49.4 | 42.4 | 57.5 | 5.5 | 3.74 | 8.08 | 8.9 |

[+] Meperidine = Pethidine = Dolantin[R]

due of 104 g of (+)-3r-N-monomethylamino-4c-phenyl-4t-ethoxycarbonylcyclohexene-(1) is obtained as a colorless oil, $[\alpha]_D^{23}$ +355° (5 g/100 ml methanol).

To obtain (+)-3r-N-monomethylamino-4t-ethoxycarbonylcyclohexene-1 hydrochloride, 100 g (0.385 mole) of the (+)-base obtained above are dissolved in 400 ml of anhydrous ethyl acetate and, with stirring at room temperature, a solution of 14 g (0.385 mole) of hydrogen chloride in 400 ml of ethyl acetate is added dropwise. After cooling, the precipitate is collected and washed with ethyl acetate; yield: 97 g (85 percent of theory) of (+)-3r-N-monomethylamino-4c-phenyl-4t-ethoxycarbonylcyclohexene-(1) hydrochloride as colorless crystals, m.p. 210°–212°C; $[\alpha]_D^{20}$ +315° (10 g/100 ml of water).

To a solution of 26 g (0.1 mole) of (+)-3r-N-monomethylamino-4c-phenyl-4t-ethoxy-carbonylcyclohexene-(1) and 100 ml of acetone was added a solution of 37.6 g (0.1 mole) of D-(−)-O,O-dibenzoyltartaric acid monohydrate and 100 ml of acetone. The formed precipitate is collected. The yield is 20.2 g of salt, $[\alpha]_D^{24}$ +78° (10 g/100 ml methanol). The salt is recrystallized twice from a small amount of methanol. The yield then amounts to 8.5 g of (+)-3r-N-monomethylamino-4c-phenyl-4t-ethoxycarbonylcyclohexene-(1)D-(−)-O,O-dibenzoyltartrate as colorless crystals, m.p. 113° C, $[\alpha]_D^{24}$ +86.5° (10 g/100 ml methanol).

To a solution of 26 g (0.1 mole) of (+)-3r-N-monomethylamino-4c-phenyl-4t-ethoxycarbonylcyclohexene-(1) and 50 ml of acetone is added a solution of 37.6 g (0.1 mole) of L(+)-O,O-dibenzoyltartaric acid monohydrate and 150 ml of acetone at room temperature. After standing overnight, the precipitate was collected and washed with a small amount of acetone. The crude yield is 32.3 g, m.p. 175°–6°C, $[+]_D^{22}$ +208.5° (2 g/100 ml methanol). The salt is recrystallized from 500 ml of methanol to give 22 g of (+)-3r-monomethylamino-4c-phenyl-4t-ethoxycarbonylcyclohexene-(1)L(+)-O,O-dibenzoyl tartrate, m.p. 185°–6°C, $[\alpha]_D^{23}$ +220° (2 g/100 ml methanol).

EXAMPLE 2

(+)-3r-N-MONOMETHYLAMINO-4c-PHENYL-4t-ETHOXYCARBONYLCYCLOHEXENE-1. DEMETHYLATION METHOD.

To a solution of 273.4 g (1 mole) of (+)-3r-dimethylamino-4c-phenyl-4t-ethoxycarbonylcyclohexene-(1) and 500 ml of chloroform, cooled to −10° C, a solution of 159.8 g (1 mole) of bromine and 150 ml of chloroform is added dropwise over 1.5 hours, with stirring. After the addition is complete, the reaction mixture is stirred at −10° C for 30 minutes. The orange-colored reaction solution is poured into 4.1 of water and the mixture is stirred for about 5 hours at room temperature until it is almost colorless. The product is made alkaline with ammonium hydroxide, the organic phase is washed twice with water and dried over magnesium sulfate, and the solvent is evaporated. A residue of 260 g is obtained. The residue is dissolved in 1 l. of anhydrous ethyl acetate and a solution of 36.5 g (1 mole) of hydrogen chloride and 1 l. of ethyl acetate is added slowly. The resultant precipitate is collected, washed and dried; yield: 186 g (63 percent of theory) of (+)-3r-N-monomethylamino-4c-phenyl-4t-ethoxycarbonylcyclohexene-(1) hydrochloride, as colorless crystals from ethyl acetate, m.p. 210°–211°C, $[\alpha]_D^{22}$ +320° (10 g/100 ml of water).

EXAMPLE 3

ACUTE TOXICITY EVALUATION

The test group consisted of 6 male mice (NMRI), each mouse weighing between 20 and 27 g. The animals were fasted (water was available ad libitum) for 16 to 18 hours prior to administration of the test substance. A solution of the test substance, 2 ml/100 g of body weight in the case of intragastric administration and 1 ml/100 g of body weight in the case of intravenous and subcutaneous administration, was given to each animal and the dose was then increased by a factor of 1.3 for each subsequent administration. The animals were observed for 7 days. The test results were evaluated according to the statistical method of J. T. Litchfield, Jr. and F. Wilcoxon, Journal of Pharmacology and Exaperimental Therapeutics, 96, 99 (1949). The results of the statistical analysis are presented in the Chart.

EXAMPLE 4

ANALGESIC ACTIVITY EVALUATION - PHENYL-p-QUINONE WRITHING TEST

The test group consisted of 12 male mice (NMRI), each mouse weighing between 20 and 27 g. The test compound was given to each animal intragastrically or subcutaneously, and after 15 and 30 minutes, a 0.02 percent solution of phenyl-p-quinone was administered intraperitoneally at a dose of 1.25 ml/100 g of body weight. When the test substance was administered intravenously, the solution of phenyl-p-quinone was given immediately thereafter. The animals were observed for 20 minutes and those animals which did not show typical pain reaction were considered to be protected. The results of a given test group were discarded if less than 11 out of 12 animals of the corresponding control group responded to the chemical insult.

These test results were also evaluated according to the statistical method of Litchfield and Wilcoxon.

Having described out invention, what we desire to secure by Letters Patent is:

1. A compound of formula (+)-I

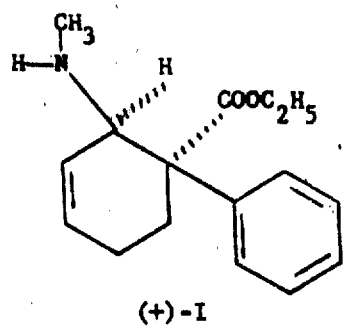

(+)-I which is (+)-3r-N-monomethylamino-4c-phenyl-4t-ethoxycarbonylcyclohexene-1, the hydrochloride, D-(−)-O,O-dibenzoyltartrate L-(+)-O,O-dibenzoyltartrate or other medically acceptable acid addition salts thereof.

2. A process for the production of (+)-3r-N-monomethylamino-4c-phenyl-4t-ethoxycarbonylcyclohexene-1 of formula (+)-I

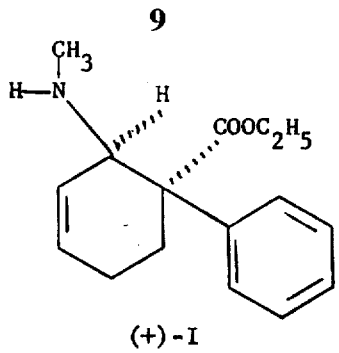

(+)-I which comprises treatment of (+)-3r-N-dimethylamino-4c-phenyl-4t-ethoxycarbonylcyclohexene-1 of formula (+)-II

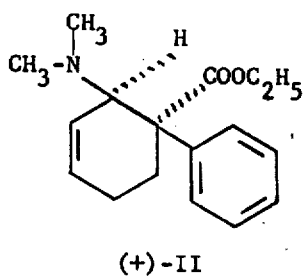

(+)-II with bromine in chloroform at −15 to 0°C, followed by treatment of the brominated product with water and recovery of (+)-I by basification, extraction and evaporation.

3. A process for the production of (+)-3r-N-monomethylamino-4c-phenyl-4t-ethoxycarbonylcyclohexene-1 of formula (+)-I

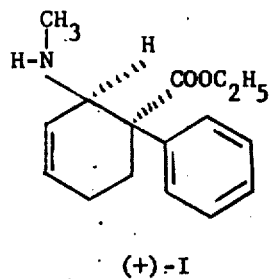

(+)-I which comprises treatment of ±-3r-N-monomethylamino-4c-phenyl-4t-ethoxycarbonylcyclohexene-1 of formula (±)-I (±)-I dissolved in acetone with one mole of D-(−)-O,O-dibenzoyltartaric acid hydrate dissolved in acetone, separation of (−)-3r-N-monomethylamino-4c-phenyl-4t-ethoxycarbonylcyclohexene-1 D-(−)-O,O-dibenzoyltartrate by filtration and isolation of the product by basification, extraction and evaporation.

4. A process for the production of the hydrochloride salt of (+)-3r-N-monomethylamino-4c-phenyl-4t-ethoxycarbonylcyclohexene-1 which comprises treatment of (+)-3r-N-monomethylamino-4c-phenyl-4t-ethoxycarbonylcyclohexene-1 with a solution of hydrogen chloride and ethyl acetate.

5. A process for the production of (+)-3r-N-monomethylamino-4c-phenyl-4t-ethoxycarbonylcyclohexene-1 L-(+)-O,O-dibenzoyltartrate which comprises treatment of (±)-3r-N-monomethylamino-4c-phenyl-4t-ethoxycarbonylcyclohexene-1, dissolved in acetone with one mole of L-(+)-O,O-dibenzoyltartaric acid monohydrate dissolved in acetone and isolation of the product by filtration.

6. A process for the production of (+)-3r-N-monomethylamino-4c-phenyl-4t-ethoxycarbonylcyclohexene-1 D-(−)-O,O-dibenzoyltartrate which comprises treatment of an acetone solution of (+)-3r-N-monomethylamino-4c-phenyl-4t-ethoxycarbonylcyclohexene-1 with an acetone solution of D-(−)-O,O-dibenzoyltartaric acid monohydrate.

* * * * *